W. CAMERON.
CAN SEAMING MACHINE.
APPLICATION FILED MAY 20, 1916.
1,406,724.
Patented Feb. 14, 1922.
7 SHEETS—SHEET 5.
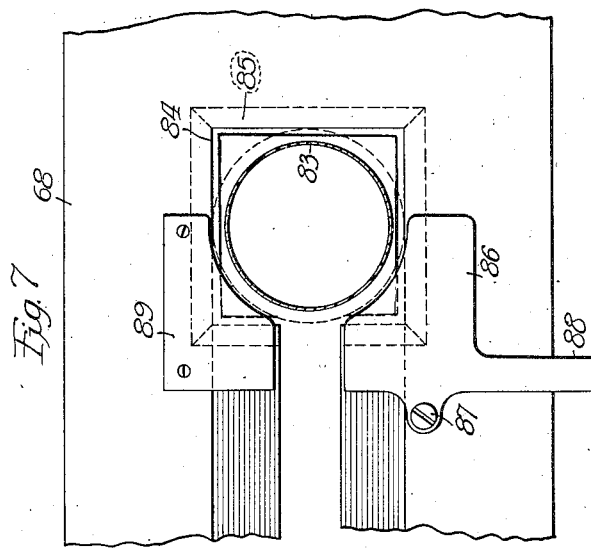
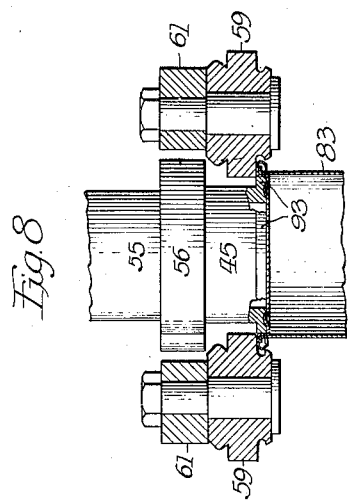
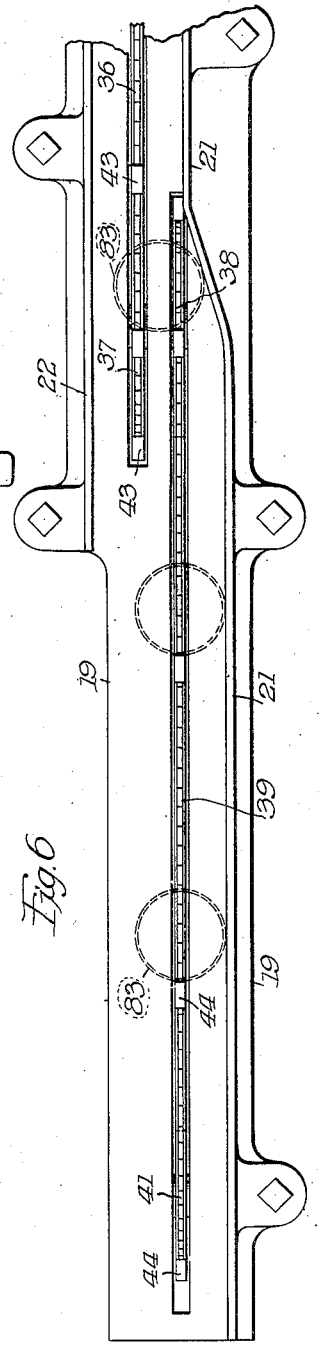
Inventor
William Cameron
By Pond & Wilson
Attys

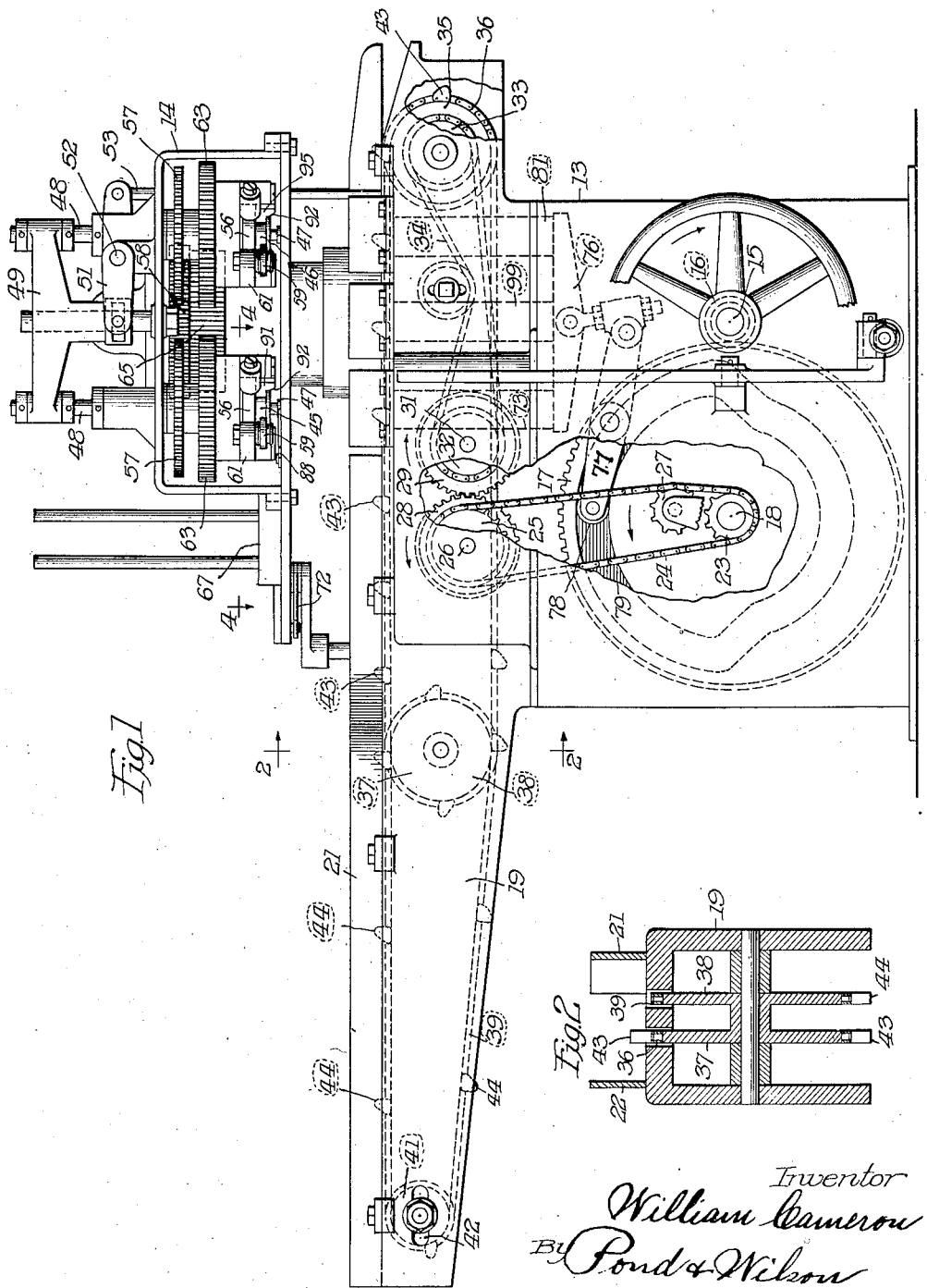

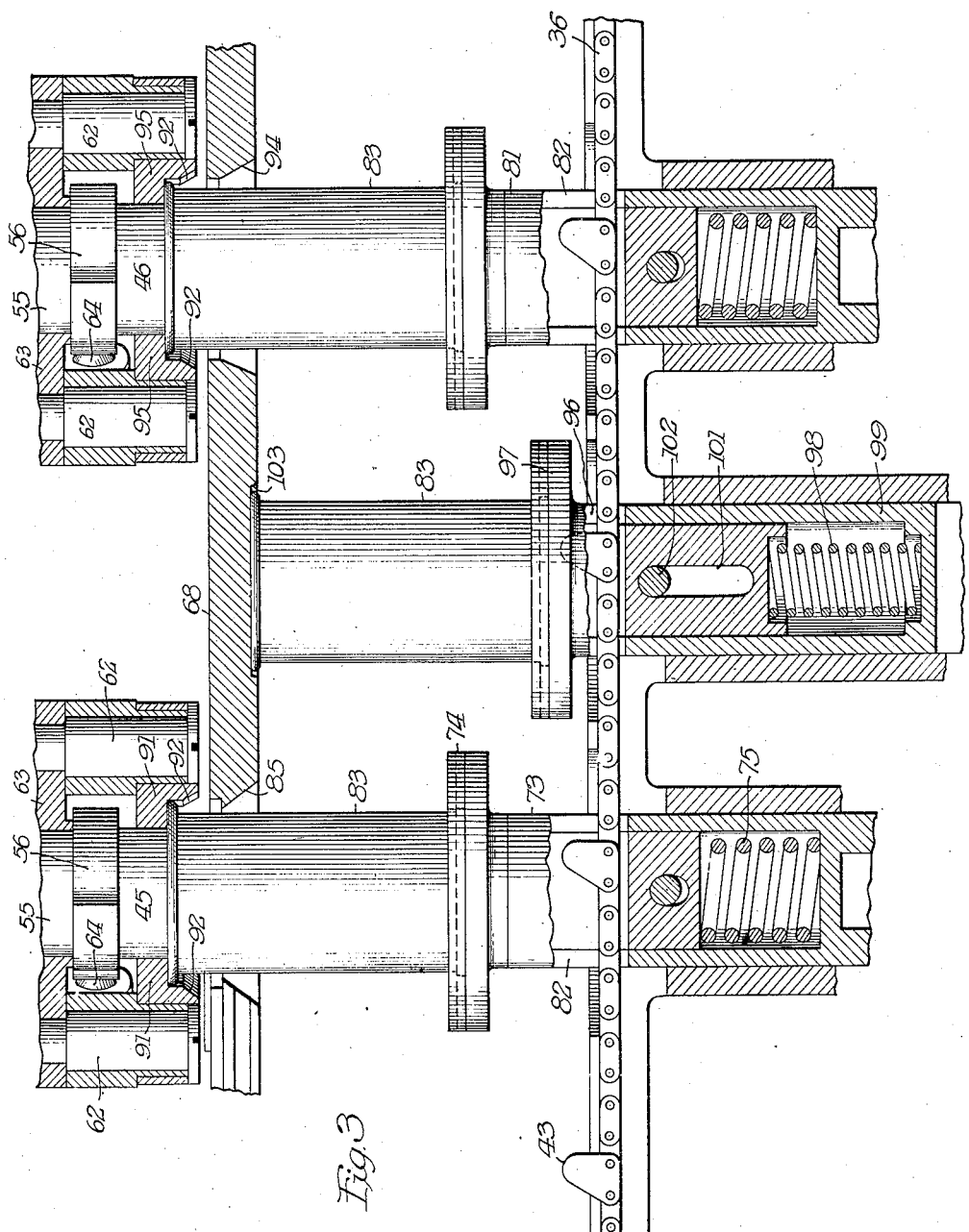

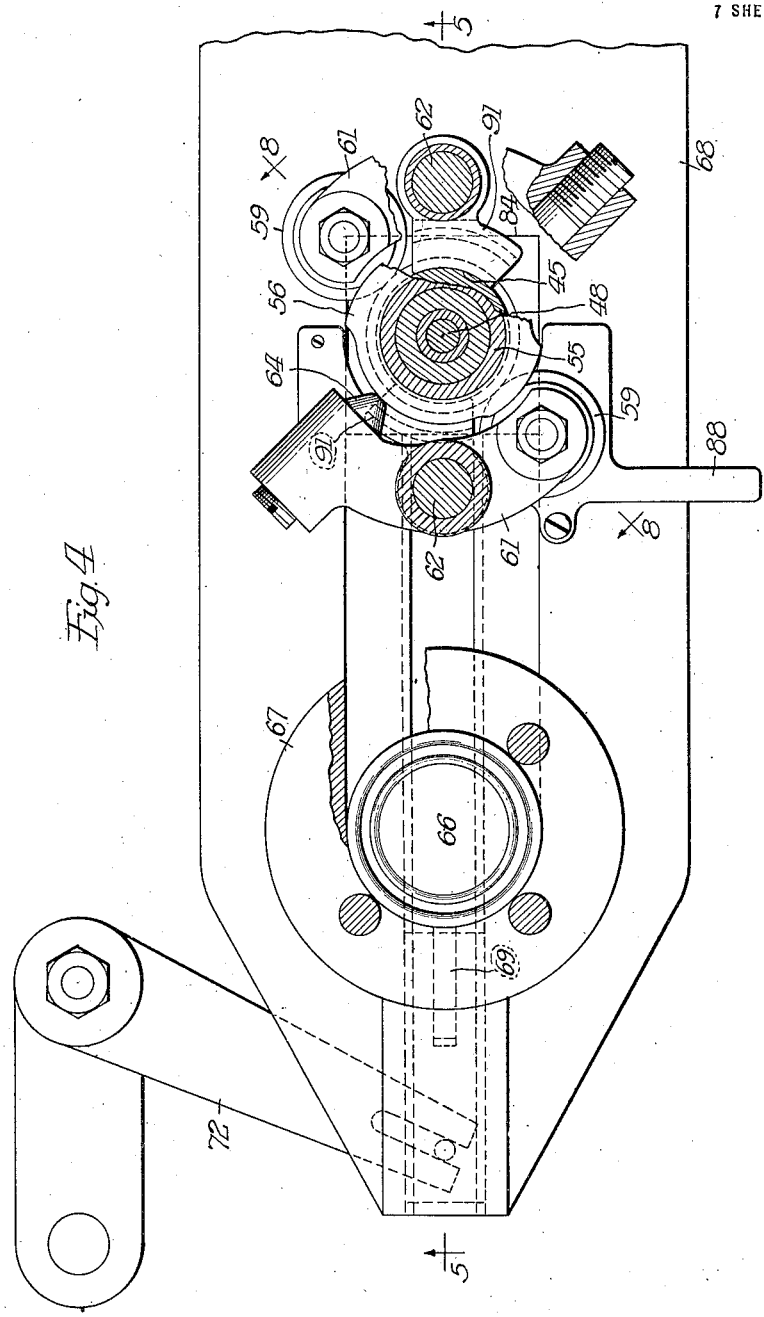

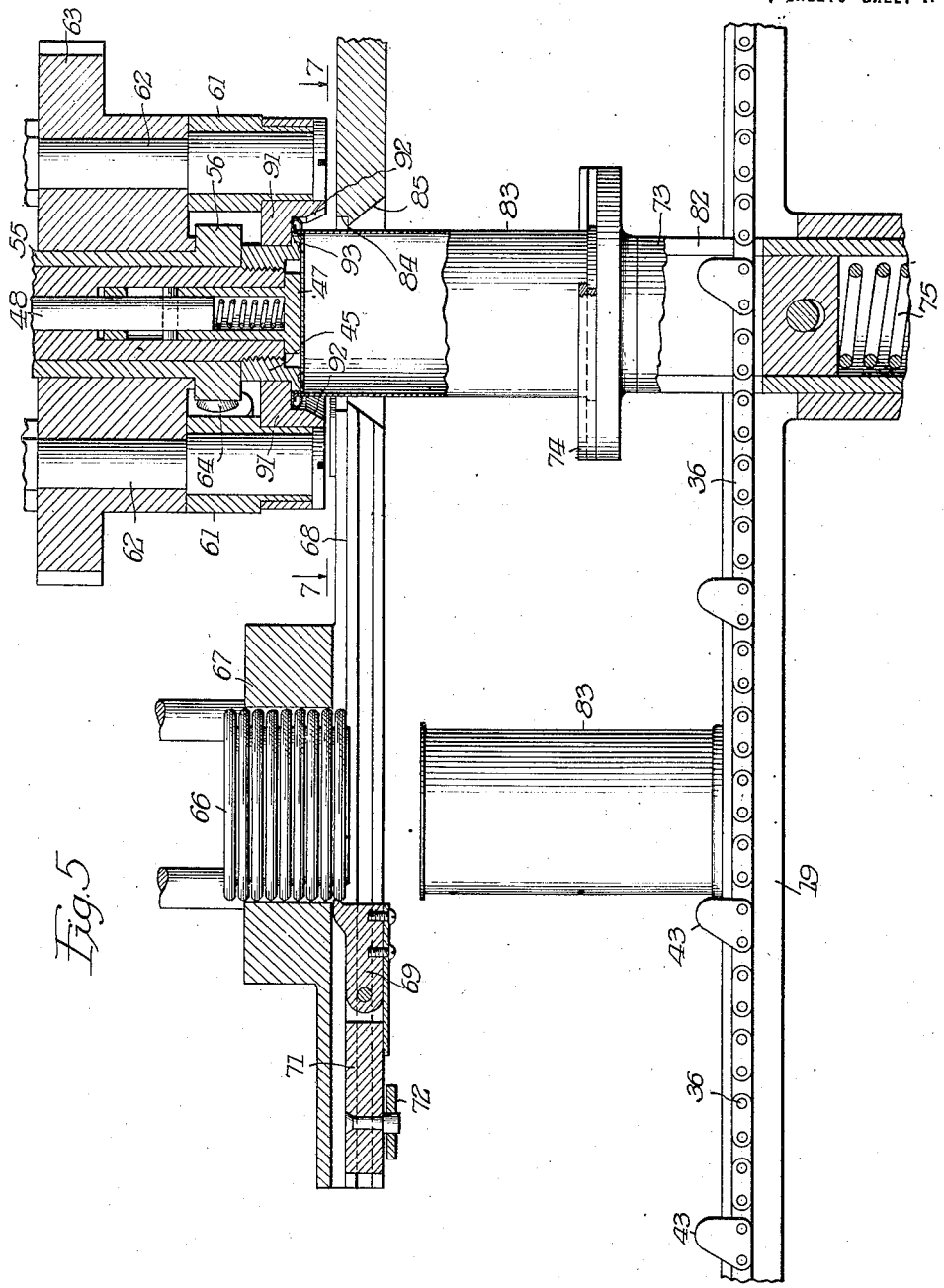

W. CAMERON.
CAN SEAMING MACHINE.
APPLICATION FILED MAY 20, 1916.

1,406,724.

Patented Feb. 14, 1922.

Inventor
William Cameron
By Pond & Wilson
Attys

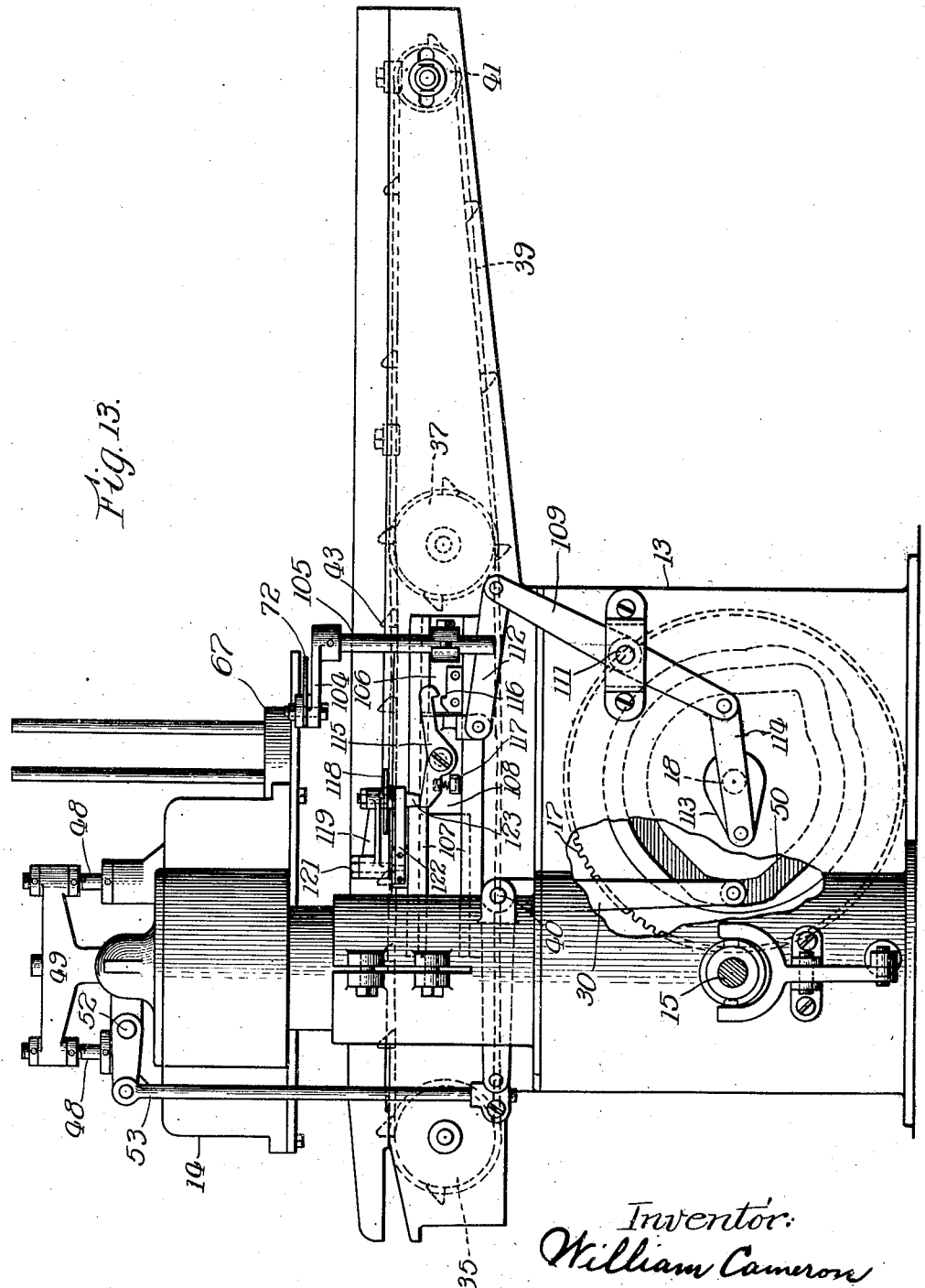

UNITED STATES PATENT OFFICE.

WILLIAM CAMERON, OF CHICAGO, ILLINOIS, ASSIGNOR TO CAMERON CAN MACHINERY CO., OF CHICAGO, ILLINOIS, A CORPORATION OF ILLINOIS.

CAN-SEAMING MACHINE.

1,406,724. Specification of Letters Patent. Patented Feb. 14, 1922.

Application filed May 20, 1916. Serial No. 98,742.

*To all whom it may concern:*

Be it known that I, WILLIAM CAMERON, a citizen of the United States, residing at Chicago, in the county of Cook and State of Illinois, have invented certain new and useful Improvements in Can-Seaming Machines, of which the following is a specification.

This invention relates in general to can seaming machines which are employed for double seaming the tops or caps onto can bodies which have previously been filled with some food product.

In machines of this general character the filled cans are customarily conveyed through the seaming machine by an intermittently actuated conveyor by which the cans are moved forward by a step-by-step movement. Certain food products, however, such as soups, vegetables and fruits, for instance, are largely liquid in character and the intermittent movement of the filled cans causes more or less of the liquid to slop over the tops of the cans before the caps are applied with the result that a considerable quantity of the liquid is spilled and wasted. One of the primary objects of my present invention is to provide a seaming machine which will convey the cans by steady, uniform and continuous movement through the machine so that practically none of the liquid in the cans will be spilled and wasted.

Since the cans are necessarily lifted from the conveyor during the seaming operations my invention also contemplates the provision of means for so handling the cans that they will not become blocked on the conveyor or positioned so as to interfere with the continuous movement of the conveyor or with the movements of each other through the machine.

Another object of my invention is to provide novel and improved means for centering the cans relatively to the mandrels and seaming rollers and also to provide means for preventing tops of the can bodies from becoming accidentally locked to the seaming mandrels in the event that a cap should fail to be in position to receive a can body when it is elevated by a chuck into seaming position.

Other objects and advantages of this invention will be apparent to those skilled in the art as the same becomes more fully understood by reference to the following description when considered in connection with the accompanying drawings upon which one practical and preferred embodiment of the invention is illustrated. Referring to the drawings—

Fig. 1 is a side elevation of a double seaming machine embodying my invention;

Fig. 2 is a sectional view on the line 2—2 of Fig. 1;

Fig. 3 is an enlarged fragmentary longitudinal sectional view showing the can elevating chucks and certain of the co-operating mechanisms;

Fig. 4 is a fragmentary horizontal sectional view taken on the line 4—4 of Fig. 1;

Fig. 5 is a sectional view on the line 5—5 of Fig. 4;

Fig. 6 is a plan view of a portion of the can-feeding mechanism;

Fig. 7 is a sectional view on the line 7—7 of Fig. 5;

Fig. 8 is a sectional view on the line 8—8 of Fig. 4;

Fig. 13 is an elevation looking at the opposite side of the machine from that shown in Fig. 1.

Figure 9:
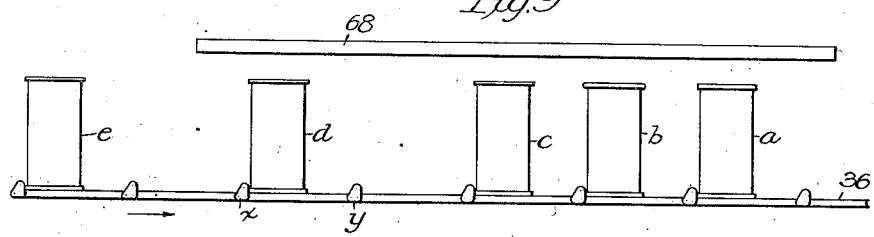
Figs. 9, 10, 11 and 12 are diagrammatic views illustrating progressive positions of the cans and the conveyor during the operation of the machine.

By reference to the drawings, and particularly Fig. 1 thereof, it will be observed that reference character 13 indicates generally the base or main frame of the machine on which the driving mechanism, the conveyor and other operating mechanisms, including the elevating chucks, are mounted. The top frame 14 of the machine, which carries the can caps and the seaming mechanisms, is adjustably mounted upon the main frame 13 so as to be capable of vertical adjustment whereby the machine is accommodated to can bodies of various heights.

Power is applied from any suitable source to the main drive shaft 15 of the machine from which the various mechanisms are operated. A pinion 16 mounted upon this shaft meshes with and drives a large gear 17 mounted upon a shaft 18, the opposite faces of the gear 17 being equipped with cam grooves of suitable shapes for purposes which will be later described. The table 19 of the machine extends forwardly a considerable distance beyond the base 13 as will be evident from Fig. 1, and the cans which have been previously filled are delivered to the outer or receiving end of this table either manually or by suitable mechanism, preferably directly from a filling machine. The upper face of the table is provided with upstanding walls or guide members 21 and 22 which serve to guide the cans as they are carried along the table by the conveying mechanism, which will now be described.

The shaft 18 is equipped with a sprocket wheel 23 which drives, through the instrumentality of a chain 24, a sprocket wheel 25 mounted upon a stub shaft 26, an idler or chain tightener 27 being employed to maintain the requisite tension upon the drive chain. A gear 28, preferably formed integrally with the sprocket wheel 25, drives a similar gear 29 mounted upon an adjacent stub shaft 31, this gear being formed preferably integrally with a sprocket wheel 32 which drives a sprocket wheel 33 by means of a drive chain 34. The sprocket wheel 33 is connected preferably integrally with another sprocket wheel 35 around which a conveyor chain 36 is trained. The opposite end of this chain travels around a sprocket wheel 37 as shown in Figs. 1, 2 and 6. Fixed upon the same shaft with the wheel 37 is another sprocket wheel 38 which drives a conveyor chain 39 trained over a sprocket wheel 41 mounted near the receiving end of the table 19, the wheel 41 being adjustably mounted in slots 42 of the table so as to act as a chain tightener. It will thus be obvious that the two chains 39 and 36 form a continuous conveyor by means of which the cans are conveyed through the machine. The chain 36 is provided at regular intervals with outwardly extending lugs or fingers 43 which engage behind the can bodies and slide them along the table, and the chain 39 is provided with similar lugs 44 which, however, are spaced apart twice as far as the lugs 43. Since the chains 39 and 36 travel at one and the same speed, the sprocket wheels 37 and 38 being of the same size, it will be manifest that if a can is fed forwardly by each lug 44 the alternate lugs only of chain 36 will receive a can and every other lug 43 will be idle as it leaves the sprocket wheel 37. The reason for this arrangement will be later described in connection with the timed relation and co-operation between the conveyor and the lifting chucks of the seaming mechanism.

The upper frame 14 carries the seaming mechanism which comprises a pair of mandrels, a pair of seaming rollers arranged to co-operate with each mandrel for performing the seaming operation, driving mechanism for revolving the seaming rollers around their respective mandrels, and means for moving the rollers into and out of operative position at periodic intervals.

Referring now to Figs. 1 to 5, reference character 45 indicates the mandrel upon which the first seaming operation is performed, and 46 indicates the mandrel upon which the final seaming operation is performed. Each mandrel is stationarily mounted in the frame and is provided with a central pusher or cap centerer 47 yieldingly mounted upon the lower end of a reciprocatory rod 48. The upper end of each of these rods is connected to a cross-head 49 which is periodically moved up and down by a lever 51 pivoted at 52 and actuated by a rod or link 53 which receives its movements through a bell crank lever 30 fulcrumed at 40 and provided with a follower engaging in a cam groove 50 formed on one face of the gear wheel 17.

A sleeve 55 surrounding each mandrel stem is provided with a cam 56 which is rotated at the requisite speed by a gear 57 fixed to the upper end of each sleeve, these gears being driven from a common driving gear 58 which in turn is driven by any suitable power conveying mechanism such as a vertical shaft, and a pair of beveled gears (not shown), directly from the drive shaft 15. These cams 56 are designed to move the seaming rollers into operative position with their respective mandrels in predetermined time relation with respect to the other mechanisms.

Each seaming roller 59 is rotatably carried by an arm 61 pivoted upon an arbor 62 carried by a gear wheel 63 rotatably journaled upon the sleeve 55. The opposite end of each arm 61 is equipped with an adjustably mounted cam follower 64 which when in engagement with a high portion of its cam 56 forces the seaming roller into operative relation with its mandrel. The gears 63 mesh with and are driven by a driving gear 65 rotatable with the driving gear 58. By reason of the fact that gear 65 is smaller than gear 58 and gears 57 are smaller than the gears 63 the seaming rollers will be revolved around their mandrels a little faster than the cams 56 revolve with the result that the seaming rollers will be intermittently moved by the cams into operative position and will be retained in this position during a predetermined period of time at each actuation.

The can caps or covers 66 are stacked in a magazine designated generally by reference character 67 located forwardly of the seaming mechanism and the caps are fed successively from the bottom of the magazine in timed relation to the movement of the can bodies so that as each can is positioned beneath the seaming mechanism a cap is positioned above the can to be seamed thereto when the seaming operation takes place. A guideway, consisting of a grooved plate 68, extends from the magazine beneath the seaming mechanisms and the caps are moved along this guideway into position beneath the mandrel 45 by a reciprocatory feeding pawl or finger 69 carried by a slide 71 which is reciprocated at predetermined intervals by an arm 72 as will be later described.

As the can is carried by the chain 36 along the table to the first chuck it actuates a feeler which controls the cap feeding mechanism and insures that a cap will be fed from the magazine only when there is a corresponding body on the conveyor to receive it.

The arm 72 is adjustably clamped to the end of a member 104 carried by a post 105 which is adjustably clamped to a sliding block 106 adapted to reciprocate in suitable guideways 107 at the side of the machine. Another sliding block 108 is mounted in the guideways 107 in front of the block 106 and this forward block is continually reciprocated in the guideways by means of a lever 109 fulcrumed at 111 and connected at its upper end to the block 108 by a link 112 and connected at its lower end to a crank 113 on the shaft 18 by means of a link 114, all as shown in Fig. 13. The block 108 carries a pivoted dog or latch 115 the rear end of which is adapted to engage with a shoulder 116 on the block 106 to lock the blocks 106 and 108 together, an expansion spring 117 disposed beneath the tail of the latch being adapted to normally urge the latch into locking engagement with said shoulder. It will be obvious that when the latch is engaged with the shoulder the sliding block 106 will be reciprocated in unison with the block 108 to feed a cap from the magazine.

It is obvious that it is desirable to feed a cap only when a can body is fed which will receive the cap. In order, therefore, to prevent the feeding of the cap from the magazine except when there is a can body on the conveyor to receive it, I have provided a can feeler which controls the operation of the latch 115. This feeler comprises a member 118 adjustably mounted on an arm 119 which is pivoted to the machine frame at 121. The feeler member is adjustably mounted on the arm so that it can be positioned for cooperation with cans of various diameters and it is normally urged into the path of the cans, being advanced by the conveyor, by means of a leaf spring 122. A lug or projection 123 carried by the arm 119 extends beneath the arm into the path of the tail of the latch 115 when the feeler is fully projected across the guideway in which the can bodies travel. When the lug is in this position, the latch 115 is rocked each time the sliding block 108 reaches its rearmost position so that the latch is prevented from engaging with the shoulder 116, as shown in Fig. 13, consequently the block 108 reciprocates idly while the cap feeding mechanism remains stationary. When, however, a can body is moved past the feeler 118, as shown in Fig. 14, the feeler is pressed outwardly by the body, thereby carrying the lug 123 outside the path of the latch 115 and when the block 108 reaches its rearmost position the latch will engage with the shoulder 116 so that upon the next forward movement of the latch the cap feeding mechanism will be carried forwardly to feed the lowermost cap from the magazine. The cap will be positioned by the feeding finger 69 in the recess 84 above the tapered portion 85 of the aperture over the chuck 74.

The cans, as they are fed forward by the alternate lugs 43 on the chain conveyor 36, are first positioned upon a vertically reciprocable chuck body 73 having a slotted head 74 adapted when in lowered position to lie flush with the table 19 so as to receive the bottom of a can. The chuck head is yieldingly supported upon the chuck body 73 by a spring 75 (Fig. 3) and the body in turn is carried by a cross head 76 (Fig. 1) which is moved up and down at regular intervals by a lever 77 equipped with a cam follower 78 which travels in a cam groove 79 formed on one face of the gear wheel 17. A similarly constructed chuck 81 disposed beneath the mandrel 46 is also carried by the cross head 76 so that the two chucks are reciprocated simultaneously and travel equal distances. When a can is brought by the chain 36 into position upon the chuck 73 the chuck rises, thereby lifting the can off from the conveyor without interfering with the continuous movement of the conveyor. The chuck body and head are provided with longitudinal slots 82 as shown in Fig. 3 through which the conveyor travels and which permit vertical movement of the chucks without interfering with the conveyor.

A cap having already been positioned on the plate 68 directly over the chuck 73 and beneath the mandrel 45, when the chuck is elevated the can 83 will be moved upwardly through the plate 68 carrying the cap upwardly with it into engagement with the lower end of the mandrel so that it is in position for the initial seaming operation by the seaming rollers. For the purpose of guiding the can in its upward travel through the plate 68 and centering the can in its upward travel I have provided this plate with a squared opening enlarged at its upper end to provide a recess 84 to receive and support the cap and tapered at 85 to insure that the can will be properly centered during its upward travel. A cap, as has been previously explained, is positioned concentrically with the opening 84 so that as the can is moved upwardly through the opening the cap is properly positioned on the upper end of the can. To permit of the removal of a cap in case it should at any time be desirable to do so, one of the guide plates 86 beneath which the cap travels into position is pivotally mounted upon a pintle or screw 87, so that the plate can be swung in a clockwise direction by means of the handle 88 into inoperative position which permits access to the positioned cap. The other guide plate 89 is preferably permanently secured to the plate 68 by screws or other suitable fastening means.

For the purpose of insuring the proper centering of both the can and its cap with respect to the mandrel I have provided centering devices which are best shown in Figs. 3, 4 and 5. These centering devices, of which there are two for each mandrel, consist of blocks or members 91 mounted upon the arbors 62 beneath the arms 61. The inner end of each block is curved, as shown in Fig. 4, to loosely contact with the head of the mandrel 45 whereby the centering blocks are held against rotation on their arbors. The blocks are provided on their bottoms with recesses shaped to provide inclined guiding surfaces 92 which serve to center the caps and guide them in their upward travel into proper position with respect to the mandrel. It will be observed from Fig. 5 that the guiding blocks present a horziontal surface just above the operating flange 93 of the mandrel. This surface limits the upward travel of the can and cap and precludes the upper end of the can body from being crimped over the flange 93 and thereby locked to the mandrel as sometimes accidentally happens in machines of this character when the machine fails to position a cap before the can body is raised by the chuck. Prior to my invention if a can was moved to seaming position without any cap disposed thereover the operation of the seaming rollers would bend the upper edges of the can over the flange of the mandrel so that the can would be securely locked thereto and could be removed only with considerable difficulty. My improved centering blocks limit the upward movement of a can body regardless of whether a cap is disposed thereover or not, with the result that it is impossible to bend the edges of the can body over the mandrel flange and a can will consequently be lowered with the chuck and passed on through the machine without injuring the machine or stopping its operation.

As has been previously explained, the preliminary seaming operation is performed on the mandrel 45 while the final seaming operation is performed on the mandrel 46. The opening 94 through the plate 68 is substantially like the opening 84 and the mandrel 46 is equipped with centering blocks 95 substantially similar in construction to the centering blocks 91, above described.

The purpose of so arranging the lugs 44 on the conveyor chain 39 that they will deliver cans only to alternate lugs 43 on the chain 36 will now be explained. Since the chain 36 travels continuously it will be obvious that when the chucks elevate cans from the conveyor into seaming position the lugs from in front of which the cans were raised will have passed onwardly beyond the chucks before the cans are lowered again onto the conveyor after the seaming operations. The lugs 43 are so spaced and the speed of the conveyor chain is so timed that the chain will travel a distance equal to the space between the lugs thereon during the period that the cans are raised above the chain. If each lug 43 were supplied with a can at its receiving end it will be obvious that the cans would pile up at the chucks and prevent the successful operation of the machine. By supplying only every alternate lug 43 with a can this difficulty is overcome. When a can is brought into position on the chuck 73 it is lifted by the chuck from in front of the lug on the conveyor which moves it into position, and after the seaming operation it is deposited on the conveyor in front of the next succeeding lug. As the conveyor travels along to bring the next can into position on the chuck the can which has been preliminarily seamed is moved approximately half way to the other seaming chuck 81. In order to permit the conveyor to continue its travel during the seaming operation without moving the partially seamed can into engagement with the elevated station chuck 81 I have provided a centrally disposed idle chuck 96 positioned half way between the seaming station chucks 73 and 81. This chuck is equipped with a head 97 yieldingly supported by a spring 98 in the chuck stem 99, an elongated slot 101 being provided in the shank of the head to receive a pin 102 extending transversely of and carried by the stem 99. The chuck stem is mounted at its lower end upon the cross head 76 as shown in Fig. 1, so that it is raised simultaneously with the chucks 73 and 81. Since it is only necessary that the chuck head 97 move upwardly sufficiently to clear the can from the traveling conveyor lugs 43 the slot 101 is made long enough to permit a full stroke of the stem 99 while the head 97 travels only a short distance. The upward travel of the head is limited by engagement of the can with the overlying plate 68 which is preferably provided with a shallow socket 103, as shown in Fig. 3, to receive the upper end of the can body with the cap partially seamed thereto.

Figure 10:
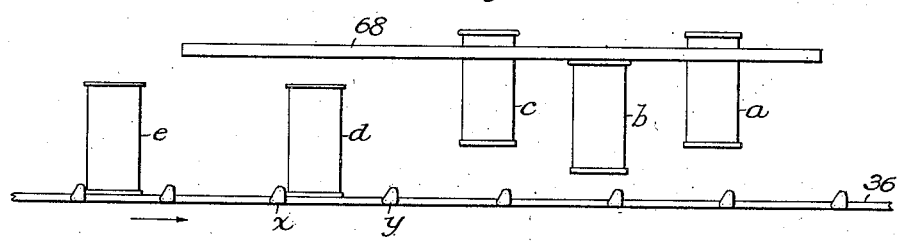
Figure 11:
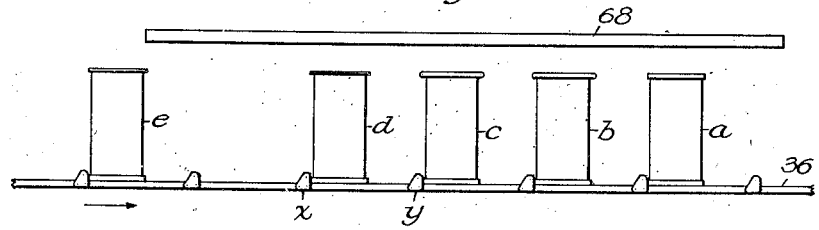
Figure 12:
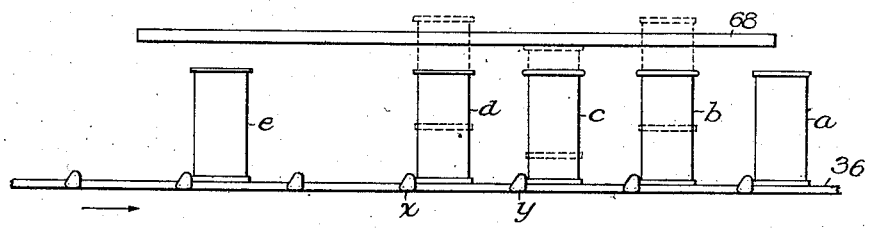

By reference to Figs. 9 to 12 inclusive it is believed that the successive operations of the conveyor and the movement of the cans will be readily understood. On these drawings I have indicated the successive cans by reference characters *a*, *b*, *c*, *d* and *e*, respectively, and two of the lugs 43 are indicated by reference characters X and Y. Referring first to Fig. 9, can *a* has just been moved into position on the final seaming chuck, can *b* is positioned upon the idle chuck, and can *c* upon the preliminary chuck 73. Cans *d* and *e* and other succeeding cans are being fed forwardly by alternate lugs on the conveyor chain 36. In Fig. 10 all of the chucks have been raised so that can *a* is being subjected to the final seaming operation, can *b* is elevated into idle position above the conveyor and can *c* is being subjected to the preliminary seaming operation. Cans *d* and *e* are traveling forward with the conveyor while the seaming operations are taking place. In Fig. 11 the seaming operations have been completed and cans *a*, *b* and *c* have been deposited again by their respective chucks upon the conveyor, but it will be noted that the conveyor in the meantime has traveled from the position shown in Fig. 9 to that shown in Fig. 11; or in other words, lug X is now in the position formerly occupied by lug Y and lug Y is moved forwardly to engage can *c*. Cans *a*, *b*, *c* and *d* are now engaged by successive lugs on the conveyor. The cans are now all moved forwardly by the conveyor to position can *b* upon the final chuck, can *c* upon the idle chuck, and can *d* upon the preliminary chuck. Can *a*, which has been finally seamed, is carried on to be delivered from the machine. Cans *b*, *c* and *d* are now raised by their respective chucks into the dotted line position shown in Fig. 12, or in other words, in the same position in which cans *a*, *b* and *c* assume in Fig. 10. While they are elevated the conveyor will move forwardly the distance between two successive lugs so that when the cans are lowered at the completion of the seaming operations can *b* will be engaged by lug Y, can *c* by lug X and can *d* by the next succeeding lug. It will thus be manifest that by using only alternate lugs at the receiving end of the chain 36 and by employing an idle chuck 96 I am enabled to feed the cans through the machine by a continuously operating conveyor which does not jerk or jar the cans so as to spill the contents thereof.

Inasmuch as the lugs 43 travel continuously there will be an appreciable horizontal movement of the can on each chuck while the chuck and can are rising from the lower position through the distance represented by the vertical can engaging edge of the lug. Conversely, during the descent of the chuck the continuous travel of the lugs 43 will shift the descending can horizontally on the chuck during descent of the can through the distance represented by the vertical can engaging edge of the lug. By accurately timing the reciprocation of the chucks with relation to the travel of lugs 43 I take advantage of the present construction to avoid spilling the liquid contents of cans by gradually changing the movement of the cans from horizontal to vertical and back to horizontal, each can moving through a curve as its direction of movement is changed, the curve having its center to the left of the can (viewing Fig. 1, for example) and above the conveyor chain 36. What I particularly avoid is a sudden movement of the liquid filled can through an exact right angle—there is no sudden arrest of the horizontal movement and no sudden resumption of it, for the horizontal and vertical movements are blended by timing the chucks so that the lugs 43 position the cans concentrically of the chucks just as the cans, in rising, separate from the lugs, and so that the cans, in descending, engage the upper ends of the lugs and are moved horizontally forward as the chucks complete their descent. By this means I obtain that continuous movement of the cans which is one of the primary objects of the present invention.

While the idle chuck 96 might be dispensed with by spacing the chucks 73 and 81 a greater distance apart and feeding the cans to the proper lugs on the conveying chain, and while such an arrangement is contemplated within the broad scope of my present invention, nevertheless, the compactness of the machine which is secured by the employment of the idle chuck is believed to make this form of the invention preferable for practical purposes and this embodiment has therefore been selected to illustrate the principles of the invention.

It is believed that the construction and operation of my invention will be understood from the foregoing without further description but it should be obvious that considerable variation and modification of the structural details illustrated and described may be resorted to without departing from the essence of the invention as set forth in the following claims.

I claim:

1. In a can-seaming machine, the combination of a continuously operating conveyor, means for simultaneously removing a plurality of cans from the conveyor and subsequently returning them thereto at predetermined points on the conveyor, and means for operating upon said cans when in removed position.

2. In a can seaming machine, the combination of a plurality of alined can elevating chucks, an endless conveyor arranged to deliver cans to said chucks and passing through said chucks, means for operating the chucks at predetermined intervals, and means for continuously operating said conveyor.

3. In a can seaming machine, the combination of a plurality of can-elevating chucks, a continuously operated conveyor provided at regular intervals with can-engaging lugs, and means for operating said chucks to maintain the cans thereon in elevated position while said conveyor travels a distance substantially equal to the spacing of said lugs.

4. In a can seaming machine, the combination of a conveyor comprising an endless chain provided with spaced can engaging lugs, and an endless chain provided with similar lugs spaced apart twice the distance between the lugs on the first mentioned chain so that cans will be delivered by said second mentioned chain to alternate lugs only of said first mentioned chain, means for removing the cans from the lugs of said first mentioned chain and returning them in co-operative relation to the lugs next succeeding those from which they were removed, and means for operating upon said cans while removed from the conveyor.

5. In a can seaming machine, the combination of a conveyor comprising a pair of conveying chains having can-engaging lugs spaced different distances apart on the two chains so that cans will be delivered by the first chain to alternate lugs only of the second chain, means for removing said cans from the second chain and returning them thereto in front of the lugs next succeeding those from which they were removed, and means for operating upon said removed cans.

6. In a can seaming machine, the combination of a continuously operating conveyor provided with spaced can-engaging lugs, means for delivering cans to alternate lugs only of said conveyor, a plurality of can seaming devices, and means for simultaneously elevating a plurality of cans off from the conveyor into operative relation with their respective seaming devices and for restoring said cans to the conveyor at points on the conveyor rearwardly of the points from which they were removed.

7. In a can-seaming machine, the combination of a continuously operating endless conveyor, a plurality of seaming stations disposed in cooperative relation to said conveyor, an idle station arranged between said seaming stations, and means for simultaneously removing a can from the conveyor at each of said seaming and idle stations.

8. In a can seaming machine, the combination of a continuously traveling conveyor, a pair of seaming station chucks, an idle station chuck disposed intermediate said seaming station chucks, means for simultaneously reciprocating all of said chucks, said idle station chuck being arranged to move a lesser distance than the seaming station chucks, and can seaming mechanism adapted to co-operate with said seaming station chucks.

9. In a can seaming machine, the combination of a continuously operating conveyor provided at regular intervals with can-engaging lugs, a pair of seaming station chucks spaced apart twice the distance between successive lugs, an idle station chuck disposed intermediate said seaming station chucks, and means for simultaneously operating all of said chucks whereby each chuck removes a can from the conveyor and returns it to the conveyor rearwardly of the point from which it was removed.

10. In a can seaming machine, the combination of a seaming mandrel, seaming rollers co-operating therewith, and means for preventing the upper edge of a can body from being crimped over the flange of said mandrel, said means including guiding elements extending below the mandrel for centering the can.

11. In a can seaming machine, the combination of a seaming mandrel, seaming rollers co-operating therewith, and means overlying the flange of said mandrel for limiting the movement of a can body on the mandrel whereby said can body is prevented from being locked over the mandrel flange, said means including guiding elements extending below the mandrel for centering the can.

12. In a can seaming machine, the combination of a seaming mandrel provided at its operating end with a radially projecting flange, a plurality of arbors revolvable about said mandrel, levers pivoted on said arbors, seaming rollers carried by said levers, and a plurality of blocks mounted on said arbors, said blocks being shaped to provide radial surfaces overlying the mandrel flange and projecting radially outward from said flange and downwardly and outwardly inclined surfaces adapted to guide and center a can as it is moved into operative relation to said mandrel.

13. In a can-seaming machine, the combination of a seaming mandrel provided at its operating end with a radially projecting flange, a plurality of arbors adapted to revolve about said mandrel, levers pivoted on said arbors, seaming rollers carried by said levers in position to cooperate with said mandrel, a cam mounted concentrically with said mandrel for actuating said levers, and a member mounted on each of said arbors and projecting into proximity to said mandrel, each of said members comprising a horizontal portion closely overlying said mandrel flange to prevent the upper end of a can from engaging over said flange, and also comprising beneath said horizontal portion a downwardly and outwardly extending portion adapted to properly center a can with respect to said mandrel.

14. In a can seaming machine the combination with a horizontal guide way for cans, of a can conveyor having a can moving lug protruding above said guide way and moving continuously, a vertically reciprocable can holding chuck having its can bearing surface normally flush with said guide way and adapted to receive cans from the guide way and return them thereto and power actuated devices for driving said lugs and chuck, said devices being timed to cause the chuck to rise during the positioning of the can thereon and to cause said can to stand substantially concentric with the chuck at the moment that the can rises above the top of the lug.

15. In a can seaming machine the combination with a horizontal guide way for cans, of a can conveyer having a can moving lug protruding above said guide way and moving continuously, a vertically reciprocable can holding chuck having its can bearing surface normally flush with said guide way and adapted to receive cans from the guide way and return them thereto and power actuated devices for driving said lugs and chuck, said devices being timed to cause the chuck to rise during the positioning of the can thereon and to cause said can to stand substantially concentric with the chuck at the moment that the can rises above the top of the lug, the timing of said devices being such that during the descent of the chuck the lug engages and moves the can prior to the alignment of the chuck and guide way.

WILLIAM CAMERON.